J. D. FORRER.
ARMATURE WINDING COIL FOR DYNAMO ELECTRIC MACHINES.
APPLICATION FILED SEPT. 8, 1908.
957,877.
Patented May 17, 1910.
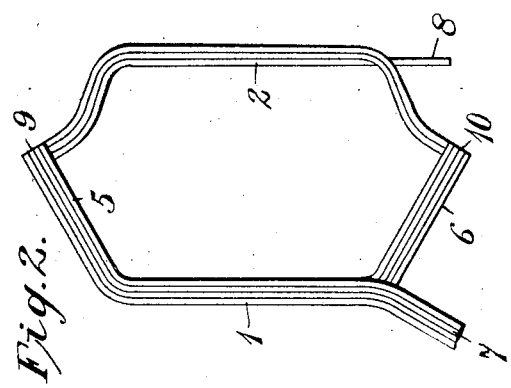
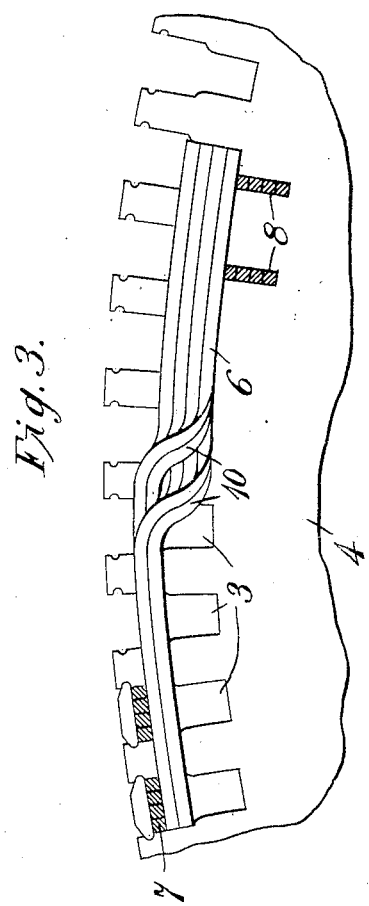
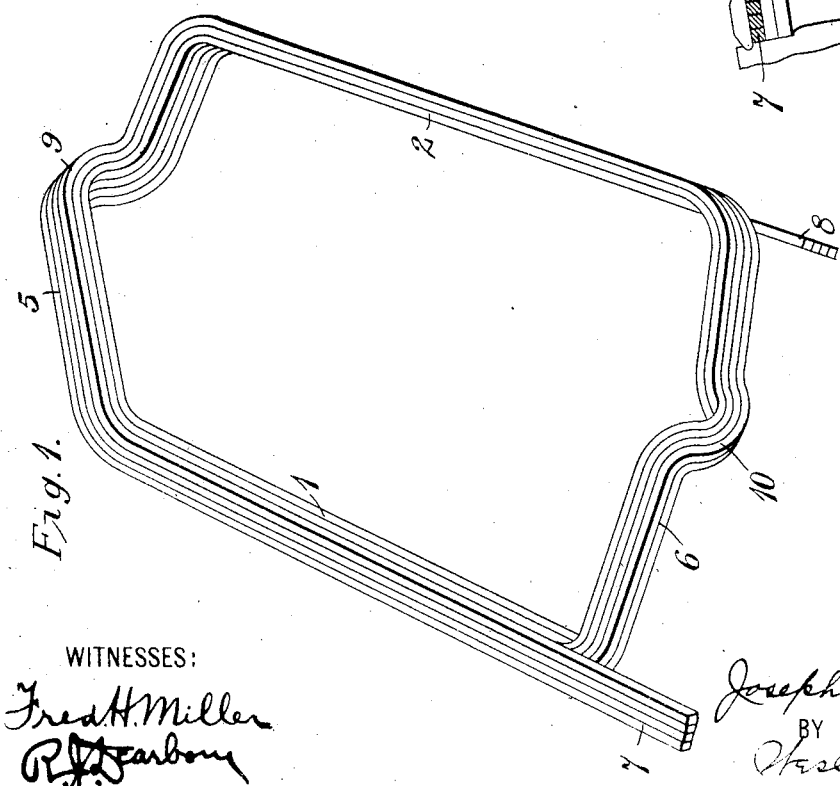
WITNESSES:
Fred H. Miller
INVENTOR
Joseph D. Forrer
BY
Wesley G. Carr
ATTORNEY

UNITED STATES PATENT OFFICE.

JOSEPH D. FORRER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

ARMATURE-WINDING COIL FOR DYNAMO-ELECTRIC MACHINES.

957,877. Specification of Letters Patent. Patented May 17, 1910.

Application filed September 8, 1908. Serial No. 452,088.

*To all whom it may concern:*

Be it known that I, JOSEPH D. FORRER, a citizen of the United States, and a resident of Pittsburg, in the county of Allegheny and State of Pennsylvania, have invented a new and useful Improvement in Armature-Winding Coils for Dynamo-Electric Machines, of which the following is a specification.

My invention relates to coils for dynamo-electric machines and it has special reference to the coils of the so-called diamond type which are adapted to form parts of the wave windings of commutator type machines.

The object of my invention is to provide an improved coil of the class above indicated that shall be relatively easy to wind and assemble in the usual core slots of motor armatures, and especially economical of space.

When direct current electric motors and generators and other dynamo-electric machines having commutators are provided with complete wave windings having coils of the diamond type, the end connecting portions of the assembled coils are close together and form two layers, one within the other.

In order to enable the adjacent coils in a complete winding to fit together closely, the end portions of each coil are usually provided with an off-set bend, at which point the conductors of which the coil is wound are bent through an angle of substantially 180°, being thus completely turned over.

According to my present invention, I twist the bundle of conductors at the off-set bends, above referred to, through an angle of substantially 90° so that, if the conductors in one slot are arranged in $x$ layers of $y$ conductors each, in the other slot they will be arranged in $y$ layers of $x$ conductors each.

Various advantages may be secured by properly proportioning the coil, as will be more specifically pointed out hereinafter.

Figure 1 of the accompanying drawings is a perspective view of an armature coil constructed and formed in accordance with my invention, Fig. 2 is a plan view of the coil shown in Fig. 1, and Fig. 3 is an end elevation of a portion of a dynamo-electric machine provided with several coils which are similar to those in Figs. 1 and 2.

Referring to the drawings, the armature coil illustrated in Fig. 1 consists of two substantially parallel straight portions 1 and 2 which are adapted to be included in the usual core slots 3 of a dynamo-electric machine, a portion 4 of which is shown in Fig. 3, end connecting portions 5 and 6 and leads 7 and 8. The straight portion 2 is adapted to be inserted in the bottom of one of the core slots 3 and, as illustrated in the drawing, it consists of four layers of three conductors each. This relation obtains in that portion of the end connecting member 5 which is adjacent to the said portion 2, the corresponding portion of end connecting member 6 consisting of four layers of two conductors each. Off-set bends 9 and 10 are provided substantially in the middle of the end portions at which the bundles of conductors are twisted through an angle of approximately 90°, so that the said portion 1 is adapted to be inserted in the top of one of the slots 3 and consists of three layers of four conductors each. If the bundle of conductors were twisted through an angle of substantially 180°, as has been usual in the prior art, the off-set bends, and consequently the end connecting portions, would occupy a materially greater space in the assembled device.

While the coil illustrated is provided with twelve conductors, as above indicated, it will, of course, be understood that my invention is not restricted to this number of conductors or arrangement of layers, the arrangement illustrated being chosen as best adapted to clearly illustrate the novel features of the invention.

As shown in Fig. 3 of the drawings, in the bottom of the slots 3 where the conductors are arranged in layers of three conductors each, the required width of slot is less than at the top of the slot in which the conductors are arranged in layers of four conductors each. A material advantage is gained by this means, particularly in the substantially cylindrical core members of such dynamo-electric machines as railway motors and the like, for the reason that the walls of the slots are preferably parallel to each other and, consequently, unless the inner half of the slots is made narrower, as shown in Fig. 3 of the drawings, the teeth, i. e., the core portions between the slots, are reduced in cross section at the bottom, thereby tending to cause a magnetic saturation of these parts. If the bottom of the slot is considered to be of normal width the top of the slot is relatively enlarged, thereby decreasing the self-induction of the winding.

The advantages effected by the reduction in the space required at the ends of the coils may, of course, be obtained with slots of uniform width, having parallel side walls, by arranging the conductors in such a way that the number of layers and the number of conductors per layer, are equal to each other.

For the sake of simplicity in the drawings a square conductor is illustrated but it will, of course, be understood that conductors of other cross section, either circular or rectangular, may be employed with equal facility.

I claim as my invention:

1. A coil for dynamo-electric machines comprising a plurality of multi-strand turns having two substantially parallel straight portions, the strands of said turns being located in one plane in one of the said portions and in another plane substantially perpendicular to the first in the other straight portion.

2. A coil for dynamo-electric machines comprising a plurality of multi-strand turns having substantially parallel straight portions and V-shaped end connecting portions, the conductors being disposed in $x$ layers of $y$ strands each in one straight portion and in $y$ layers of $x$ conductors each in the other straight portion.

3. A coil for dynamo-electric machines comprising a plurality of multi-strand turns having substantially parallel straight portions, V-shaped end connecting portions and off-set bends in said end connecting portions, the strands being twisted through an angle of approximately 90° at the off-set bends.

4. A coil for dynamo-electric machines comprising a plurality of multi-strand turns having two substantially parallel straight portions adapted to be included in the core slots of a dynamo-electric machine, the strands of said turns being disposed in radial layers in one straight portion and in tangential layers in the other straight portion.

5. In a dynamo-electric machine, the combination with a substantially cylindrical core member having a plurality of longitudinal slots in radial planes, of a coil comprising multi-strand turns, having two parallel straight portions disposed within predetermined core slots, the strands of said turns being disposed in radial planes in one slot and in tangential planes in the other slot.

In testimony whereof, I have hereunto subscribed my name this 31st day of August, 1908.

JOSEPH D. FORRER.

Witnesses:
J. E. WEBSTER,
BIRNEY HINES.